United States Patent
Gretz

(10) Patent No.: US 7,374,212 B1
(45) Date of Patent: May 20, 2008

(54) RAIN TIGHT FITTING

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 1017 days.

(21) Appl. No.: 10/393,606

(22) Filed: Mar. 21, 2003

(51) Int. Cl.
*F16L 13/14* (2006.01)
(52) U.S. Cl. ............... 285/382.7; 285/341; 285/354
(58) Field of Classification Search ............ 285/136.1, 285/139.1, 139.2, 139.3, 149.1, 151.1, 207, 285/245, 249, 248, 255, 382.7, 341, 354
See application file for complete search history.

(56) References Cited

U.S. PATENT DOCUMENTS

| | | | | |
|---|---|---|---|---|
| 1,809,582 A | * | 6/1931 | Church | 285/340 |
| 2,064,140 A | * | 12/1936 | Appleton | 285/340 |
| 2,255,673 A | * | 9/1941 | McDermott | 285/382.7 |
| 2,326,929 A | * | 8/1943 | Cowles | 285/334.5 |
| 2,479,483 A | * | 8/1949 | Elkeberry | 439/191 |
| 2,513,115 A | * | 6/1950 | Sprigg | 285/249 |
| 3,684,322 A | * | 8/1972 | Kotsakis | 285/343 |
| 3,989,283 A | | 11/1976 | Pepper | |
| 4,019,762 A | * | 4/1977 | Eidelberg et al. | 285/340 |
| 4,022,499 A | | 5/1977 | Holmes et al. | |
| 4,194,770 A | | 3/1980 | Richards | |
| 4,260,182 A | | 4/1981 | Bruner | |
| 5,037,140 A | * | 8/1991 | Anderson | 285/139.2 |
| 5,171,693 A | * | 12/1992 | Johnson et al. | 436/85 |

(Continued)

FOREIGN PATENT DOCUMENTS

| | | | | |
|---|---|---|---|---|
| AT | OE 215236 | * | 5/1961 | 285/341 |
| GB | 394354 | * | 6/1933 | |
| GB | 1146673 | * | 3/1969 | 285/341 |
| GB | 2080900 A | * | 2/1982 | 285/382.7 |

*Primary Examiner*—Aaron M Dunwoody

(57) ABSTRACT

A compression fitting that obtains a rain tight fit on electrical conduit. The compression fitting includes a tubular body having a threaded forward end for connection to a panel and a threaded rearward end for connection to a conduit. A standard lock nut and seal ring, or, alternately, a snap ring and a seal ring are used on the forward end for obtaining a rain tight fit of the forward end with a panel or junction box. A compression nut, compression ring, and two seal rings are used on the rearward end to secure a conduit thereto in a rain tight fit. A first seal ring is constructed of plastic and includes a V-shaped outer periphery. A second seal ring is typically constructed of a deformable metal such as aluminum and includes a V-shaped inner periphery. The rearward end of the tubular body includes a seat shaped to accept the second seal ring. Tightening the compression ring onto the tubular member forces the compression ring to compress the first and second seal rings against the seat in the rearward end of the tubular body. The adjacent surfaces of the V-shaped outer periphery of the first seal ring, the V-shaped inner periphery of the second seal ring, and the surface of the seat compress flush against each other and form a rain tight seal. The compression fitting of the present invention creates a secure rain tight seal that overcomes the shortcomings of prior art compression fittings for conduit, which typically feature a split ring arrangement for sealing the conduit against the fitting.

3 Claims, 5 Drawing Sheets

U.S. PATENT DOCUMENTS

| | | | |
|---|---|---|---|
| 5,188,401 A * | 2/1993 | Staniforth | 285/322 |
| 5,554,395 A * | 9/1996 | Hume et al. | 425/549 |
| 6,220,279 B1 * | 4/2001 | Segien | 137/359 |
| 6,273,477 B1 * | 8/2001 | Ohmi et al. | 285/328 |
| 6,302,449 B1 * | 10/2001 | Clayton | 285/192 |
| 6,538,201 B1 * | 3/2003 | Gretz | 174/65 G |

* cited by examiner

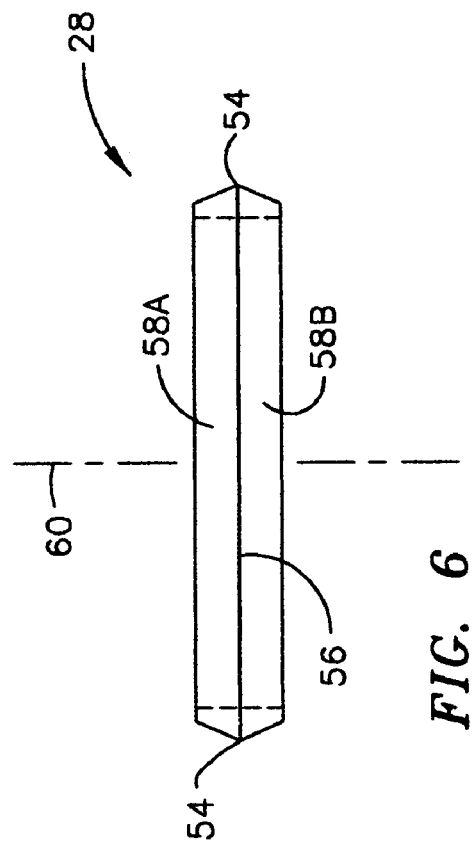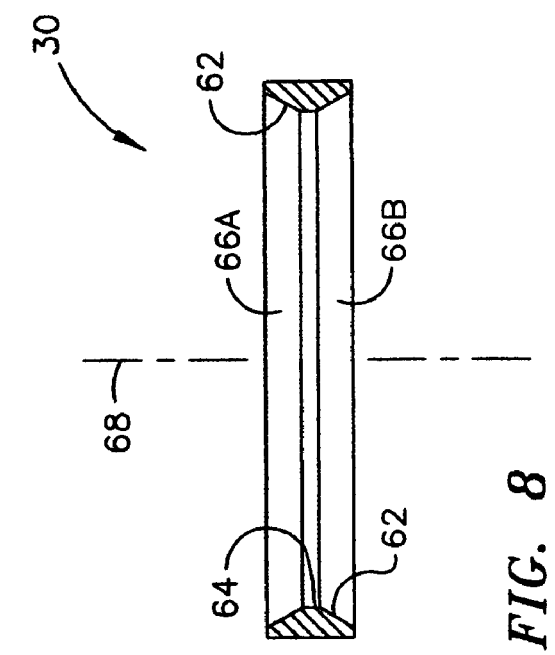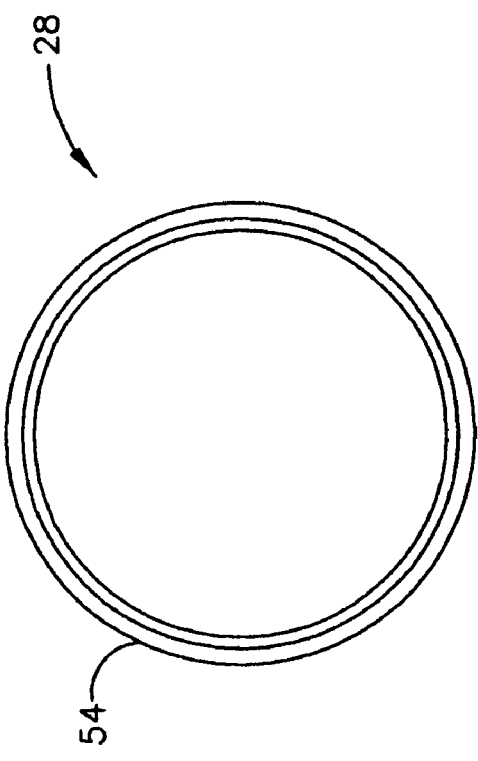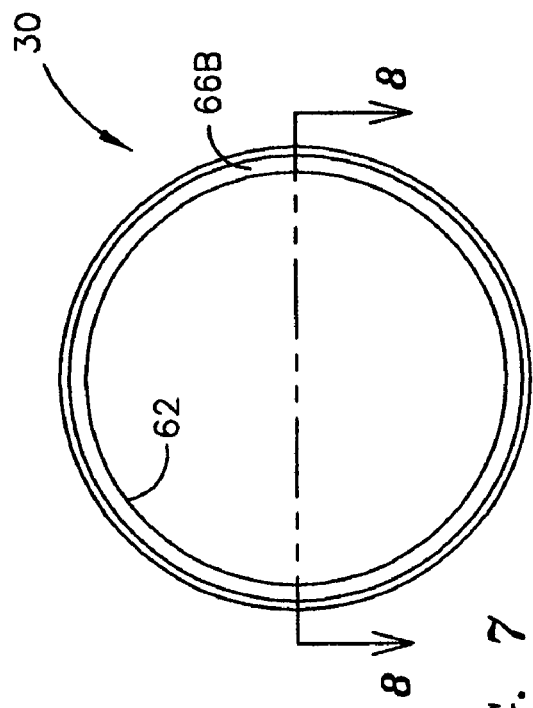
FIG. 6
FIG. 8
FIG. 5
FIG. 7

RAIN TIGHT FITTING

FIELD OF THE INVENTION

The invention relates to fittings for conduit and specifically to an improved compression fitting for joining non-metallic or metallic conduit to junction boxes or panels in a rain tight connection.

BACKGROUND OF THE INVENTION

Compression fittings are commonly used in the electrical industry for connecting conduit or tubing to bulkheads, panels, and junction boxes. The compression fitting used for this purpose typically includes a split ring. The split ring typically surrounds the conduit or tubing and seats on the compression ring and, as the compression nut is tightened, the two portions of the split ring are forced together by the force of the tightening compression nut against the split ring and the compression ring. In an ideal installation, the split ring is forced fully closed and the two surfaces of the split ring join together forcefully enough to create a rain tight fit.

Unfortunately, compression fittings of the type including a split ring very rarely form a rain tight fit on rigid conduit. The reasons for this are simple. Conduit, whether EMT (electrical metallic tubing) or plastic conduit, rarely has a perfectly formed outer surface as called for by industry specifications. EMT for example, often includes a weld seam that runs longitudinally along the outer surface of the conduit and is a byproduct of the manufacturing process. If a weld seam exists on the outer surface, a compression fitting using a split ring will not obtain a rain tight fit. Other flaws are typically found in electrical conduit, including out-of-roundness and tolerances that are out of specification.

As a result of the typical non uniformities encountered in commercially available electrical conduit, compression fittings employing split rings seldom obtain a rain tight fitting as claimed by the fitting manufacturer.

It is therefore an object of this invention to provide a compression fitting that is capable of obtaining a rain tight fit on all types of commercially available conduit, which typically may be out of round or include surface irregularities such as extending weld seams.

SUMMARY OF THE INVENTION

The invention is a compression fitting that obtains a rain tight fit on electrical conduit. The compression fitting includes a tubular member having a forward end for connection to a panel and a threaded rearward end for connection to a conduit. A standard lock nut and seal ring, or, alternatively, a snap ring and a seal ring are used on the forward end for obtaining a rain tight fit of the forward end with a panel or junction box. A compression nut, compression ring, and two seal rings are used on the rearward end to secure a conduit thereto in a rain tight fit. A first seal ring is constructed of plastic. A second seal ring is typically constructed of deformable metal such as aluminum. Tightening the compression ring onto the tubular member forces the compression ring to compress the first and second seal rings against the rearward end of the tubular member. The compression fitting of the present invention creates a secure rain tight seal that overcomes the shortcomings of prior art compression fittings for conduit, which typically feature a split ring arrangement for sealing the conduit against the fitting.

DESCRIPTION OF THE DRAWINGS

FIG. 5 is a plan view of an aluminum seal ring that forms part of the rain tight fitting of FIG. 1.

FIG. 6 is an end view of the aluminum seal ring of FIG. 5.

FIG. 7 is a plan view of a plastic seal ring that forms part of the rain tight fitting of FIG. 1.

FIG. 8 is a sectional view of the plastic seal ring of FIG. 7.

TABLE OF NOMENCLATURE

| Part No. | Part Description |
| --- | --- |
| 20 | rain tight fitting |
| 22 | tubular body member |
| 24 | rearward end of body |
| 26 | forward end of body |
| 28 | first seal ring |
| 30 | second seal ring |
| 32 | compression ring |
| 34 | compression nut |
| 36 | fastening arrangement |
| 38 | forward seal ring |
| 40 | locknut |
| 41A | washer |
| 41B | spring steel adaptor |
| 42 | wrench receiving flange |
| 44 | first bore |
| 46 | second bore |
| 48 | peripheral seat |
| 50 | inner periphery of forward end |
| 52 | seal ring seat |
| 54 | V-shaped outer periphery of first seal ring |
| 56 | middle of outer periphery |
| 58A | first beveled surface of first seal ring |
| 58B | second beveled surface of first seal ring |
| 60 | central axis of first seal ring |
| 62 | V-shaped inner periphery of second seal ring |
| 64 | middle of inner periphery |
| 66A | first beveled surface of second seal ring |
| 66B | second beveled surface of second seal ring |
| 68 | central axis of second seal ring |
| 70 | conduit |

DESCRIPTION OF THE INVENTION

Figure 1:
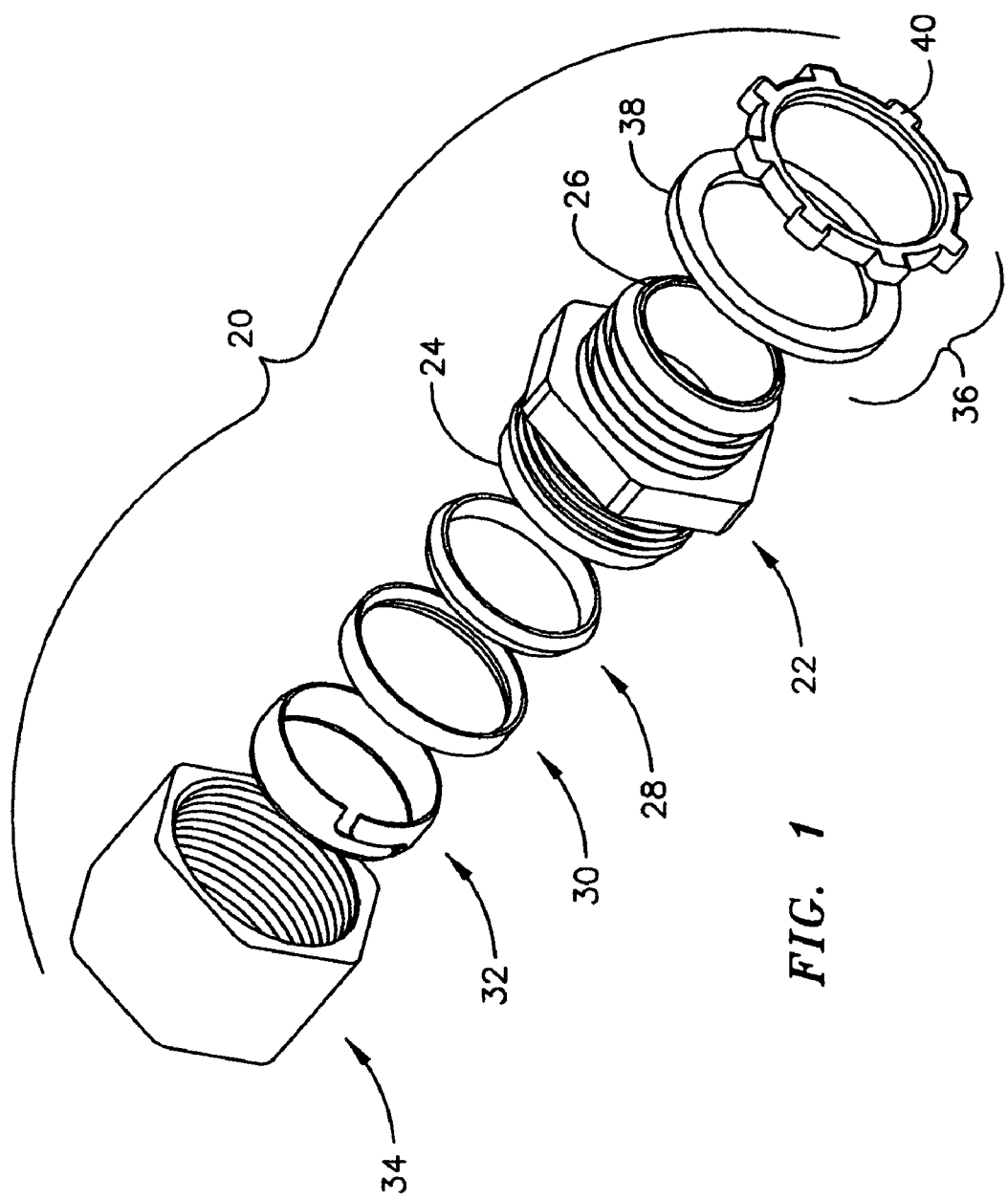
FIG. 1 is an exploded perspective view of a preferred embodiment of a rain tight fitting according to the present invention.
Figure 10:
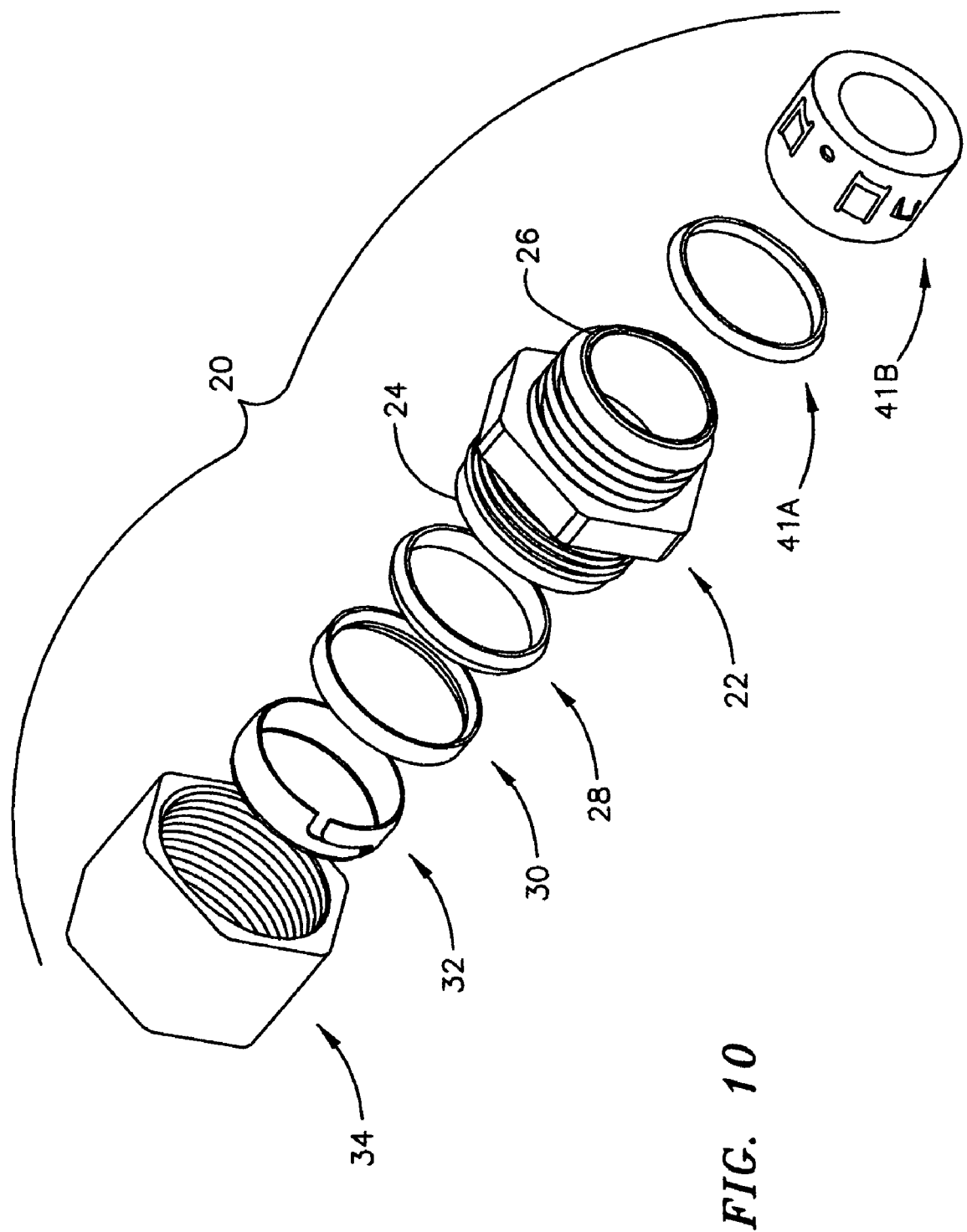
FIG. 10 is an exploded perspective view of an alternative embodiment of a rain tight fitting according to the present invention and depicting a fastening arrangement including a spring steel adaptor and a washer.

Referring to FIG. 1, an exploded view is depicted of a preferred embodiment of a rain tight fitting 20 according to the present invention. The rain tight fitting 20 includes a tubular body member 22 having a threaded rearward end 24 and a forward end 26, a first seal ring 28, a second seal ring 30, a compression ring 32, a compression nut 34 and a fastening arrangement 36 on the forward end 26. The ends of the fitting 20 are named in reference to the way they will interact with a panel (not shown) that they will be connected to. The forward end 26 of the fitting 20 will face the panel and the rearward end 24 will face away from the panel. The fastening arrangement 36 may consist of a forward seal ring 38 and a lock nut 40 as shown in FIG. 1, or, as shown in FIG. 10, may alternatively consist of a spring steel adaptor 41B and a washer 41A as disclosed in U.S. application Ser. No. 10/017,537, filed Oct. 22, 2001 to Gretz and incorporated herein by reference in its entirety.

Figure 4:
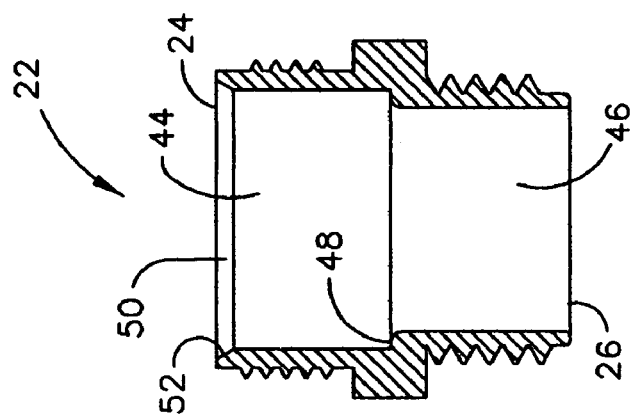
FIG. 4 is a sectional view of the tubular member taken along line 4-4 of FIG. 2.
Figure 3:
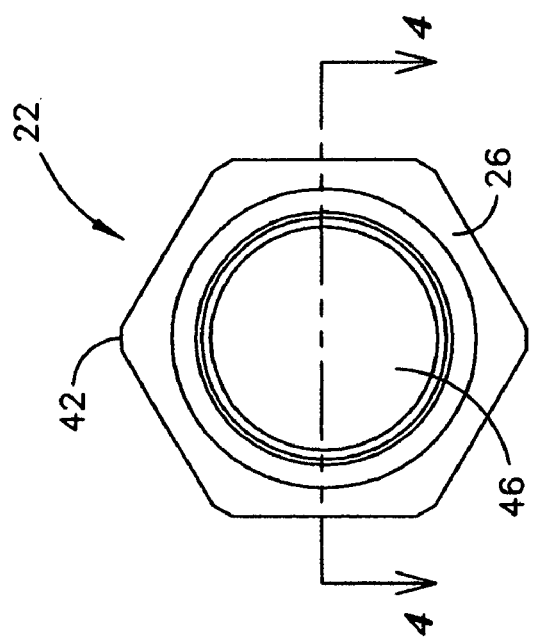
FIG. 3 is an end view of the tubular member taken along line 3-3 of FIG. 2.
Figure 2:
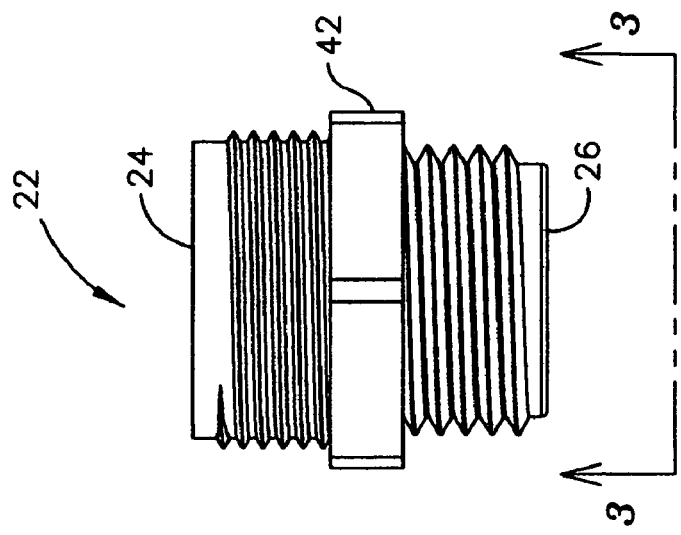
FIG. 2 is a side view of a tubular member that comprises a portion of the rain tight fitting of FIG. 1.

Referring now to FIGS. 2 through 4, the tubular body 22 includes a flange 42 approximate the middle of its longitudinal length, which extends to a wider diameter than the forward end 26 and threaded rearward end 24. The flange 42 may include a hex surface to facilitate gripping and rotating the tubular body 22 with a wrench or similar tool (not shown). The tubular body 22 includes a first bore 44 at the rearward end 24 that is of a wider diameter than a second bore 46 at the forward end 26. As shown in FIG. 4, a peripheral seat 48 is formed within the tubular body 22 at the juncture of the first 44 and second 46 bores. The inner periphery 50 of the rearward end 24 is beveled to create a seal ring seat 52 as shown.

With reference now to FIGS. 5 and 6, the first seal ring 28 includes a V-shaped outer periphery 54 with a maximum diameter at the middle 56 of the outer periphery and two beveled surfaces 58A and 58B that slope downward to the outer edges of the first seal ring 28. The beveled surfaces 58A, 58B of the V-shaped outer periphery 54 are preferably at an angle of between 20 and 40 degrees from the central axis 60 of the first seal ring 28.

Referring to FIGS. 7 and 8, the second seal ring 30 includes a V-shaped inner periphery 62 with a minimum diameter at the middle 64 of said inner periphery and two beveled surfaces 66A and 66B that slope to a maximum diameter at each inner edge of the second seal ring 30. The beveled surfaces 66A, 66B of the V-shaped inner periphery 62 are at an angle of between 20 and 40 degrees from the central axis 68 of the second seal ring.

Figure 9:
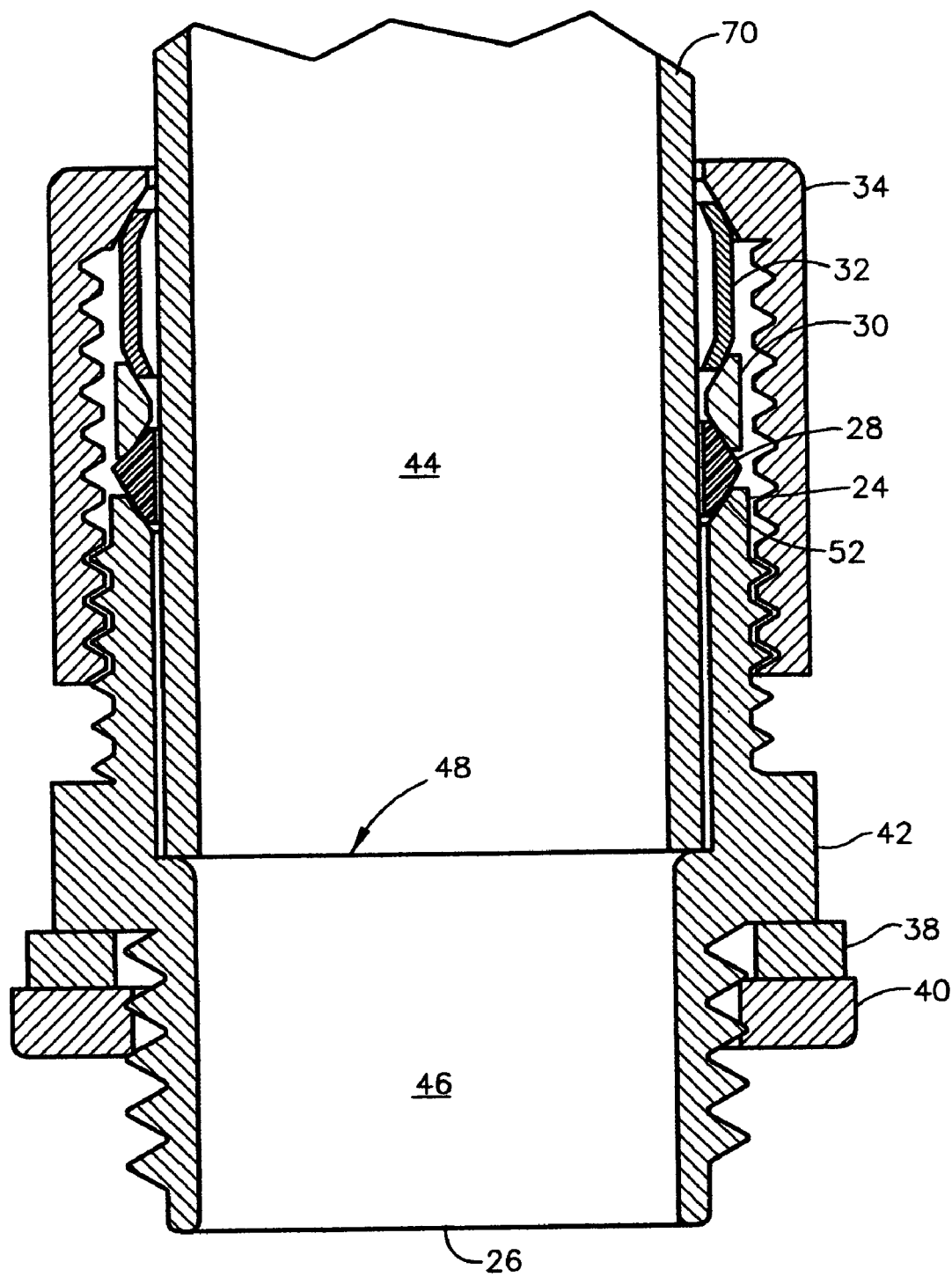
FIG. 9 is a sectional view of the rain tight fitting of FIG. 1 with the various pieces assembled but in an uncompressed state.

The assembled rain tight fitting 20 of the present invention is supplied as shown in FIG. 9. When partially threaded upon the rearward end 24 of the tubular body 22, the compression nut 34 contains the compression ring 32, the second seal ring 30, and the first seal ring 28 within the volume delimited by the compression nut 34 and the tubular body 22. The invention is operated by first inserting a conduit 70 through the compression nut 34, compression ring 32, second seal ring 30, and first seal ring 28 until it is seated in the peripheral seat 48 at the juncture of the first bore 44 and the second bore 46. A wrench (not shown) is then applied to the flange 42 and the compression ring 32 tightened onto the tubular body 22 until the compression ring 32 compresses the second 30 and first 28 seal rings between the nut 34 and the tubular body 22 thereby forming a rain tight seal between said conduit and said fitting. After full tightening of the compression nut 34 onto the tubular body 22, the first seal ring 28 is substantially compressed into the seal ring seat 52 on the inner periphery of the rearward end 24 of the body 22. Being a continuous ring and not a split ring as in prior art compression fittings, the first seal ring 28 therefore is compressed between the beveled surface of the seal ring seat 52 and the outer surface of the conduit 70, thereby effectively sealing the fitting 20 against rain. The second seal ring 30 transfers and evenly distributes the pressure from the advancing compression ring 32 onto the first seal ring 28.

The first seal ring 28 of the present invention is preferably constructed of plastic or an elastomer. If constructed of plastic, the first seal ring 28 is preferably PVC, polycarbonate, nylon, polypropylene, polyethylene, or polystyrene. If constructed of elastomer, the first seal ring 28 is preferably Santoprene®, which is available from Advanced Elastomer Systems, L.P. of Akron, Ohio.

The second seal ring 30 of the present invention is preferably constructed of a metal. The preferred metal for construction of the second seal ring is aluminum, zinc, or steel.

The preferred material of construction of the tubular body 22, the compression ring 32, the compression nut 34, and the lock nut 40 is zinc or steel.

Although the description above contains many specifics, these should not be construed as limiting the scope of the invention but as merely providing illustrations of a preferred embodiment of the rain tight fitting of this disclosure. Typical sizes are provided to illustrate a given embodiment of the present invention and should not be construed as limiting its scope.

Thus the scope of the invention should be determined by the appended claims and their legal equivalents, rather than by the specific examples given.

What is claimed is:

1. A rain tight fitting for securing conduit to a panel and comprising:
   a tubular body member including a forward end and a threaded rearward end, a flange, a first bore in said rearward end, and a second bore in said forward end;
   a fastening arrangement on said forward end for securing said fitting to a panel;
   said first bore larger than said second bore;
   a seat at the juncture of said first bore and said second bore;
   a seal ring seat on the inner periphery of said rearward end, said seal ring seat having a conical surface at a constant incline with respect to said tubular body member;
   a first seal ring having a forward end disposed against said seal ring seat, said first seal ring a continuous ring constructed of plastic or elastomer;
   a second seal ring having a forward end disposed against said first seal ring, said second seal ring a continuous ring constructed of metal;
   a compression ring having a forward end disposed against said second seal ring;
   a compression nut having an inner surface and threads for mating with said rearward end of said tubular body;
   said compression ring having a rearward end disposed against inner surface of said compression nut,
   said first seal ring including a solid cross-section, a V-shaped outer periphery with a maximum diameter at the middle of said outer periphery, and two beveled surfaces there from to a minimum diameter at each outer edge of said first seal ring;
   said beveled surfaces of the outer periphery of said first seal ring is at an angle of between 20 and 40 degrees from the central axis of said first ring;

said beveled surfaces of said outer periphery of said first seal ring match the angle of said seal ring seat on said inner periphery of said rearward end of said tubular body;

said second seal ring includes a V-shaped inner periphery with a minimum diameter at the middle of said inner periphery and two beveled surfaces there from to a maximum diameter at each inner edge of said ring;

said beveled surfaces of said inner periphery of said second seal ring are at an angle of between 20 and 40 degrees from the central axis of said second seal ring; and said angle of said beveled surfaces of said inner periphery of said second seal ring match the angle of said beveled surfaces of said outer periphery of said first seal ring.

2. The rain tight fitting of claim 1 wherein said fastening arrangement includes a forward seal ring and a lock nut.

3. The rain tight fitting of claim 1 wherein said fastening arrangement includes a spring steel adaptor and a washer.

* * * * *